(12) United States Patent
Rogier

(10) Patent No.: US 6,202,190 B1
(45) Date of Patent: Mar. 13, 2001

(54) PROCESS FOR DETERMINING THE START- UP TIME OF A DATA PROCESSING SYSTEM

(75) Inventor: Pierre Rogier, Grenoble (FR)

(73) Assignee: Bull, S.A., Louveciennes (FR)

( * ) Notice: Subject to any disclaimer, the term of this patent is extended or adjusted under 35 U.S.C. 154(b) by 0 days.

(21) Appl. No.: 09/127,598

(22) Filed: Jul. 31, 1998

(30) Foreign Application Priority Data

Aug. 14, 1997 (FR) .................................................. 97 10373

(51) Int. Cl.$^7$ .............................. G06F 11/00; G06F 17/00
(52) U.S. Cl. ................................. 714/815; 714/55; 706/45
(58) Field of Search ............................. 714/815, 55, 736; 706/45

(56) References Cited

U.S. PATENT DOCUMENTS

| | | | |
|---|---|---|---|
| 4,727,549 | 2/1988 | Tulpule et al. | 714/55 |
| 4,849,879 | * 7/1989 | Chinnaswamy et al. | 706/45 |
| 5,696,952 | * 12/1997 | Pontarelli | 713/600 |
| 5,718,111 | * 2/1998 | Ling et al. | 60/39.02 |

FOREIGN PATENT DOCUMENTS 0372682   6/1990   (EP) .

2668271   4/1992   (FR) .

OTHER PUBLICATIONS

Pollack R.B. et al. "Prediction F Search Algorithm Runtimes Using TIme–Complexity Parameters", International Conference on Systems Engineering, Fairborn, OH, Sep. 9–11, 1987, No. –, Sep. 9, 1987, Institute of Electrical & Electronics Engineers, pp. 511–515, XP000042247 *p. 512, line 7 –p. 513, line 1*.

"Detection of End of Post Test by Monitoring a System Manufacturing Port", IBM Technical Disclosure Bulletin, vol. 37, No. 6B, Jun. 1, 1994, p. 657/658, XP000456131.

* cited by examiner

Primary Examiner—Emmanuel L. Moise
(74) Attorney, Agent, or Firm—Miles & Stockbridge P.C.; Edward J. Kondracki (57) ABSTRACT

In a data processing system, the startup time ($T_j$) of the system (S) is measured for configurations (j) and parameters are determined relative to the maximum quantity (n) of various types of hardware from measurements performed on the system, so as to be able to deduce, by calculation and from a formula containing the parameters, the startup time ($T_q$) relative to any configuration (q) of the data processing system (S).

24 Claims, 7 Drawing Sheets

PROCESS FOR DETERMINING THE START- UP TIME OF A DATA PROCESSING SYSTEM

TECHNICAL FIELD

The invention relates to a process for determining the startup time of a data processing system. This data processing system can be of any size, micro, mini or large-scale. It is constituted by the main and peripheral hardware. For purposes of simplification, the term "hardware" is used herein in place of main and peripheral units or equipment. The invention is more particularly adapted to data processing systems equipped with an operating system whose startup occurs sequentially. The invention applies to both single-processor and multiprocessor systems. It applies particularly to multi-node multiprocessor systems wherein the nodes are equipped with an operating system whose startup, or at some least some phases of the startup, occurs sequentially. It applies particularly to a system with a redundant architecture based on high availability of the data.

Corollary subjects of the invention are a data processing system for implementing the process and a recording medium for storing the software that is the subject of the invention.

PRIOR ART

A data processing system does not generally operate in uninterrupted fashion. It is subject to intentional and unintentional halts. The unintentional halts are mainly due to failures. When the system is restarted, it is said to start up. More precisely, when the system completely restarts from zero, it is said to cold start. The system can also restart from an intermediate position, called a warm start, in order to ensure a faster restart while losing a minimum of the work already accomplished. The invention applies to both types of restarts defined above. In the description below, a cold start will be used as an illustration. At the startup, the system undergoes an initialization. It completely recreates the operating environment. Powering up during a cold start consists of applying an instruction received by the processor in the form of an interrupt, which interrupt is most often called a RESET. It uses an interrupt vector or code sequence which is located at a certain address in main memory. At this address, there is generally a branch instruction to the startup sequence, called a bootstrap program.

The problem is the startup time of the system after the power up which can be long. From the power up through the final phase in which an invitation message authorizes the utilization of the system, a series of successive phases takes place, including:

- the phase of tests known by the name of POST (Power On Self Test), performed in the main hardware. The tests comprise the testing of the operation of the processor, the testing of the various controllers (keyboard, etc.), and the testing of the prime bytes of the RAM memory. During this phase, there is a lot of memory access. This time is a function of both the quantity of memory and the size of the memory;
- the hardware recognition phase and the creation of a hardware tree;
- the formatting of this tree into a format which can be interpreted by the kernel of the system; and
- the phase for starting up the kernel and starting up the process sequencer, which consists of executing the initialization file. The execution can be the initialization of the peripheral drivers, the telecommunication protocol layer (OSI, TCP-IP, etc.), or the disk group driver. During this phase, the driver provides the operating system with status information, that is, indications of the hardware type and particularly, of its capacities. The driver also provides a series of routines known as driver functions. The predefined drivers are installed in the kernel of the operating system.

These accesses to the various hardware units have a duration which depends on the hardware type and on the quantity of hardware of this type. A number of factors affect the initialization time of the driver, such as:

- the time for loading the so-called "intelligent" code resident in the peripheral hardware;
- the time for positioning the read heads; and
- the time for synchronizing certain network cards with the network.

Moreover, a peripheral unit can be connected to other peripherals known as sub-peripherals. These peripherals require a certain amount of time for detecting the presence of these sub-peripherals.

During the cold start, the master processor serializes each task and reviews each peripheral unit one by one. Each type of hardware has a more or less substantial workload and sometimes, depending on its quantity, or even its size in some cases, has the consequence of slowing the startup time of the system.

The startup time of a system lasts for a time which is more or less long as a function of the hardware configuration of the system. The term configuration means the layout of the data processing system, that is, its hardware composition. This startup time has an impact that is not without consequences on the availability ratio of the system. This is especially true for a system with a redundant architecture, whose availability ratio is inversely proportional to the startup time. This time must therefore be as short as possible.

At the present time, there are no fast means for determining the startup time of a system and above all, no general method which makes it possible to determine the startup time of a system. The only way is to perform measurements manually in the laboratory. This type of measurement is costly in terms of time.

Moreover, a data processing system is intended to offer services to its users, and the quality of these services will be more appreciated if their performance is better. In the present case, performance refers to the startup time of the system.

SUMMARY OF THE INVENTION

A first object of the invention is to provide a method, which is both general and automatic, for determining the startup time of a data processing system.

A second object is the capability to evaluate the impact of a potential modification of the hardware constituting the system.

A third desired object is the fast execution of the process for determining the startup time of the system.

A fourth desired object is the ease of use of the process for determining the startup time of the system.

And a fifth object sought is to reduce the cost.

To this end, the subject of the invention is a process for determining the startup time of a data processing system, said data processing system being constituted by various types of hardware, characterized in that it is comprised of measuring the startup time of the system for configurations j and of determining parameters relative to the maximum quantity of the various hardware types from measurements performed on the system, so as to be able to deduce, by calculation and from a formula containing the parameters, the startup time $T_q$ relative to any configuration q of the data processing system.

The result is a data processing system for implementing the process of the invention.

Another subject of the invention is a recording medium such as a CD-ROM for storing the software.

BRIEF DESCRIPTION OF THE DRAWINGS

The invention will be better understood by reading the following description, given as an example and in reference to the appended drawings.

DETAILED DESCRIPTION OF EXAMPLES ILLUSTRATING THE INVENTION

In order to simplify the description, the same elements illustrated in the drawings have the same reference characters.

Figure 1:
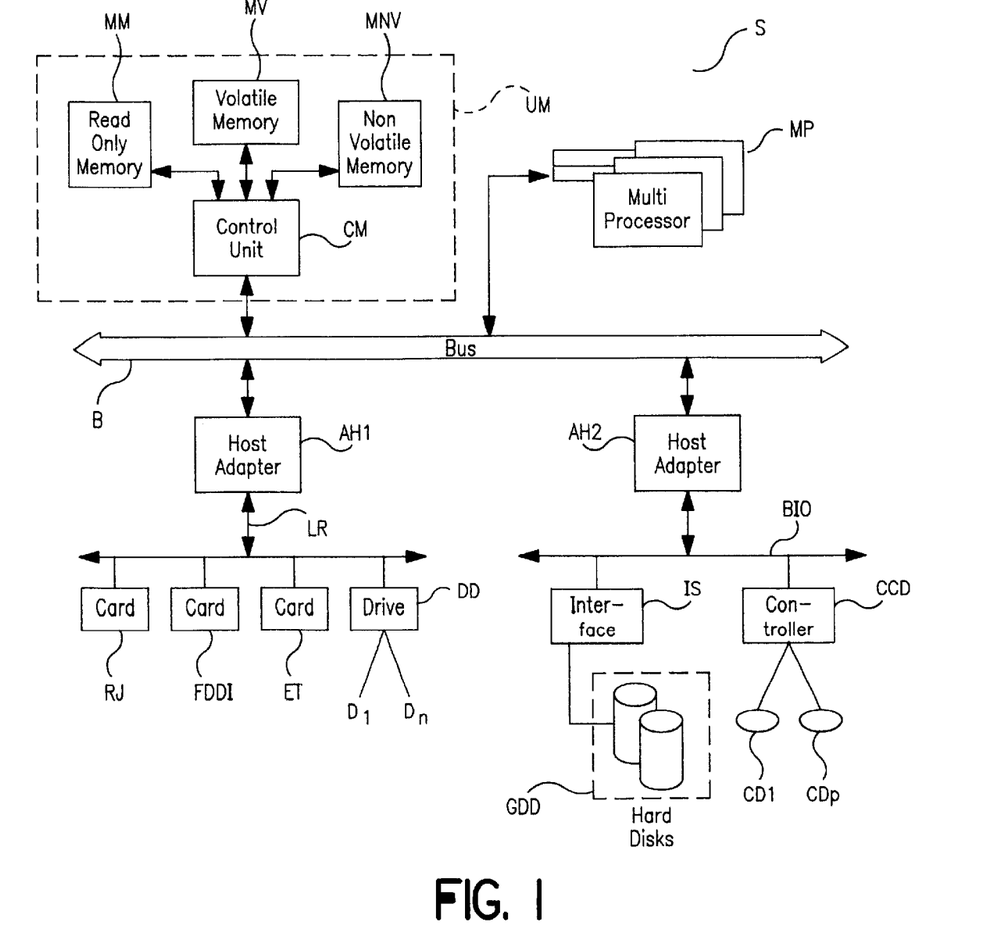
FIG. 1 represents a synoptic view of the architecture of a data processing system in which the process according to the invention may be applied.

FIG. 1 represents an example of a data processing system S to which the invention may be applied. The various hardware components represented are chosen by way of example and are not in any way limiting. The system S is a multiprocessor MP system, but can also be adapted into a single-processor system. This system can constitute a node of a multi-node system. One of these processors MP is assigned the job of master processor. This assembly is linked to a bus B. A memory unit UM is represented, which is linked to the bus B and comprises a memory control unit CM linked to various types of memories: a first read-only memory MM of the ROM type in which is stored a bootstrap program executed during the restart of the system, a second volatile memory MV of the RAM type in which is stored the initialization file, and a final non-volatile memory MNV of the NOVRAM type in which is stored, among other things, the tree of the hardware present in the system, as mentioned in the preamble of the description.

The data processing system S is composed of various hardware units. In the example illustrated, a host adapter AH1 is linked to the bus B toward which several lines LR of a network converge. This adapter AH1 can be operated from terminals, for example in the case of a data bank query. This adapter AH1 is linked to various network cards which can be, for example, of the token-ring type RJ, or the FDDI (Fiber Distributed Data Interface) type, or even the Ethernet type ET. This same adapter AH1, in the example illustrated, is linked to a disk drive DD which is itself connected to a quantity m of diskettes D1 through Dm, m varying according to the needs of the user. Another host adapter AH2 is present in the system S and is linked to the bus B. It is also linked to an input-output bus BIO of the SCSI (Small Computer System Interface) type. The bus BIO is a hardware unit of the so-called "intelligent" type, and it allows the coexistence of the most diverse hardware units. In the example illustrated, a hardware unit CD of the CD_ROM type, equipped with its controller CCD, is represented. The quantity p of hardware units CD can be variable. The SCSI bus BIO is linked to a group of hard disks GDD through a specialized interface IS of the ESDI (Enhanced System Device Interface) type. The function of this interface IS is to drive the mechanism of the disks GDD. This type of system S is a standard system known in the prior art.

The problem is that, throughout the startup, that is, from the power up through the final phase in which an invitation message authorizes the utilization of the system, a series of successive phases takes place. This situation, as mentioned in the introduction, results in a startup time that lasts for a time which is more or less long as a function of the hardware configuration of the system.

For this reason, the invention proposes a process for determining the startup time of a data processing system S. This data processing system S is constituted by various types i of hardware. The process is comprised of measuring the startup time $T_j$ of the system for configurations j and of determining parameters relative to the maximum quantity of the various types i of hardware from measurements performed on the system, so as to be able to deduce, by calculation and from a formula containing the parameters, the startup time $T_q$ relative to any configuration q of the data processing system S.

The process of the invention is comprised, first of all, of defining parameters. The parameter $P^i$ indicates the quantity of hardware of the same type i. The quantity of hardware $P^0$ of the type i=0 can be, for example, the set of diskettes labelled D1 through Dm. The term "set" is used in the mathematical sense. Hereinafter, the quantity of hardware $P^1$ of the type i=1 can be the set of storage disks of the CD-ROM type CD1 through CDp, the quantity of hardware $P^2$ of the type i=2 can be the specialized interface IS of the ESDI type, etc.

By definition, the master processor executes each task sequentially. The process of the invention is comprised of using a mathematical formula which symbolizes the startup time in proportion to the hardware quantity that composes the system for configurations j. This formula has the form:

$$T_j = \sum_{i=0-n} P_j^i \times \alpha^i \tag{f}$$

where, as parameters,
  i is the indicator of a given hardware type.
  j is the indicator of the configuration.
  $T_j$ is the startup time of the system S for a configuration j.
  $\alpha_i$ is the unit time cost specific to the hardware unit of type i.
  $P_j^i$ is the quantity of the hardware of type i in a configuration j.
  n is the quantity of hardware of various types composing the system.
  Consider the configuration type j. $P^0_j$ is the quantity of hardware of the same type i=0 in the configuration j.

Likewise, $P^1_j$ is the quantity of hardware of the same type i=1 in the configuration j, and $P^n_j$ is the quantity of hardware of the same type i=n in the configuration j.

Figure 2:
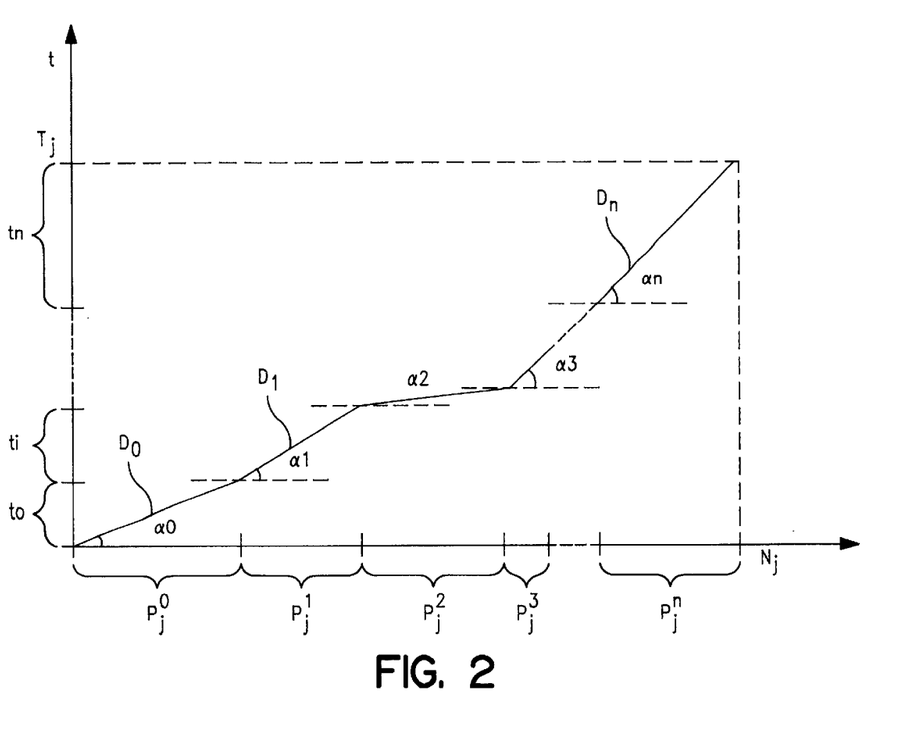
FIG. 2 represents a graph illustrating the variation of the time, during the startup, as a function of a given configuration of the system.

FIG. 2 is a graph illustrating the variation of the startup time of the system as a function of a configuration j of the system. By definition, the master processor executes each task successively. In the example illustrated, the master processor starts with the hardware of the type i=0. Each hardware unit of this type is handled individually. In concrete terms, each diskette D1 through Dm is analyzed individually during the startup, one after another. This graph clearly shows the sequential nature of each task executed by the processor.

The x-axis represents the hardware configuration of the system S and the y-axis represents the corresponding time costs $t_i$. In this figure, each line segment corresponds to a hardware type i. At the initial instant, that is, at the power-up, each phase of the startup is executed. The time variation is linear in accordance with the sequential nature of the startup. A time cost $t_0$ is attributed to the set of hardware of the type i=0. Likewise, a linear line segment $D_0$ is attributed to the set of hardware of the type i=0. In the same way, a time cost $t_i$ is attributed to each set of hardware of a given type i. Likewise, a line segment $D_i$ is attributed to each of them. The time cost $t_i$ of each set of hardware of a type i is distinguished from the unit time cost $\alpha^i$ by the fact that the unit time cost corresponds to a hardware unit considered individually. For example, a unit time cost $\alpha^0$ is associated with each diskette Dm, which is a hardware unit of the type i=0. Likewise, $t_1$ is the time cost of the set of hardware of the type i=1. Thus, the set of hardware $P^0_j$ of the type i=0 corresponds to a time cost $t_0$, the set of hardware $p^1_j$ of the type i=1 corresponds to a time cost $t_1$, and so on up to the hardware of the type i=n, in successive steps.

The unit time cost $\alpha^i$ of a hardware unit of the type i corresponds to the direction coefficient of this line segment $D_i$. This direction coefficient is constant for a hardware unit of the same type i. Another characteristic of the invention is comprised of determining the parameters $\alpha^i$ for each hardware type i.

In the example illustrated, $N_j$ is the total quantity of hardware constituting the system in a configuration j. $N_j$ is therefore the sum of all the hardware composing the system in a configuration j:

$$N_j = \sum_{i=0-n} P^i_j$$

$T_j$ is the calculated startup time of the system for a configuration of type j. The startup time of the system is $T_j$ and corresponds to the sum of all the time costs ($t_0$ through $t_n$). More precisely, $t_0$ is the product of the unit time cost times the associated hardware of the type i=0, or $\alpha^0 \times P^0_j$.

An algorithm according to the present invention will now be described in reference to FIG. 3. This algorithm comprises a plurality of steps. Step 10 indicates that the user is starting this series of steps. Step 15 defines the maximum quantity n of the various hardware units of type i composing the system S and subject to a cold start. Step 20 designates a first configuration j=1 from among n configurations of the system S. A configuration j is preferably a real existing hardware configuration. This configuration phase starts with the first hardware type i=1 (step 25), which is subjected to an analysis (step 30). This analysis is comprised of determining whether the type of hardware in question is a processor. In effect, the quantity of processors is the only parameter which does not verify the formula (f) defined above. The processor time is not always correct and reliable. Several passes of the same command may result in different processing times by different processors. If the hardware of type i is a processor, the process returns to step 25 to proceed to another type of hardware. If the latter is not a processor, it proceeds to step 35. This step is comprised of defining the quantity of hardware $P^i_j$ of the same type i in a configuration j. This information is stored in step 40. The process proceeds to the next hardware type i+1, which is subjected to the same treatment as its predecessor, and so on, so as to form an iterative loop B1. This loop B1 continues until each type of hardware has been analyzed.

The step for the configuration j=1 has reached its end. The time $T_j$ of the configuration j=1 is measured. In step 55, the measured time is stored. In the same way, another configuration j+1 of the system is determined. Another iterative loop B2 is executed. Preferably, configurations of the system S are established in a quantity equal to the various types i of hardware composing the system. Thus, steps 20–55 are repeated until the quantity of configurations j is equal to the predefined quantity n of hardware types i.

Step 60 is comprised of entering all the values determined into tables. A first table comprises, for example, the times measured. A second table comprises the quantity of hardware for each configuration.

Preferably, these tables are matrices. A first one-dimensional matrix [T] is defined. This matrix represents the startup time calculated for each configuration j. A second two-dimensional matrix [P] represents the quantity of hardware of the same type as a function of the configuration. Each row of the matrix [P] represents, for example, a configuration j, and each column represents the quantity of hardware.

Figure 4:
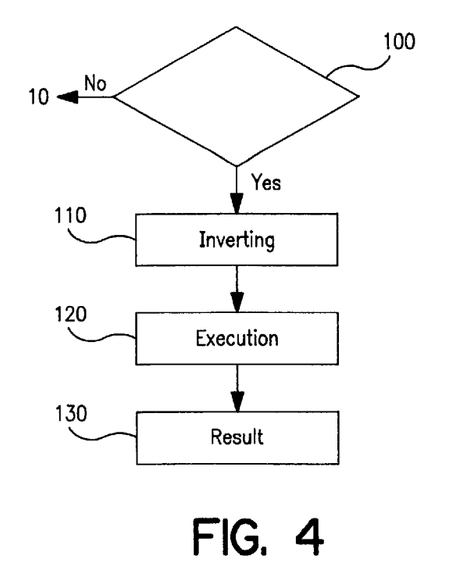
FIG. 4 is an algorithm illustrating a method for determining the unit time cost $\alpha^i$ according to the invention.

FIG. 4 represents an algorithm illustrating the method for determining the time costs $\alpha^i$ of each hardware unit of type i. By definition, the formula (f) defined above applies.

Step 100 is comprised of verifying certain mathematical rules relative to the utilization of the matrices. The matrix [P] must be, among other things, invertible. In the opposite case, the user is invited to return to step 10 and to redefine configurations in such a way that the matrix [P] verifies these mathematical rules. If it does, step 110 is comprised of inverting the matrix [P]. Step 120 executes the product $[P]^{-1} \times [T]$, which is the product of the matrix [T] by the inverse of the matrix [P], in order to calculate the unit time costs of each type of hardware in step 130. The unit time costs are represented by a matrix labelled [$\alpha$]. At this instant, the unit time cost $\alpha^i$ of each hardware unit of type i is determined. It is then possible to detect the large time consumers. The unit time costs make it possible to determine which hardware type slows down the startup of the system the most. The user can use these time costs and take steps to adopt a configuration with which the startup time will be optimal.

Figure 5:
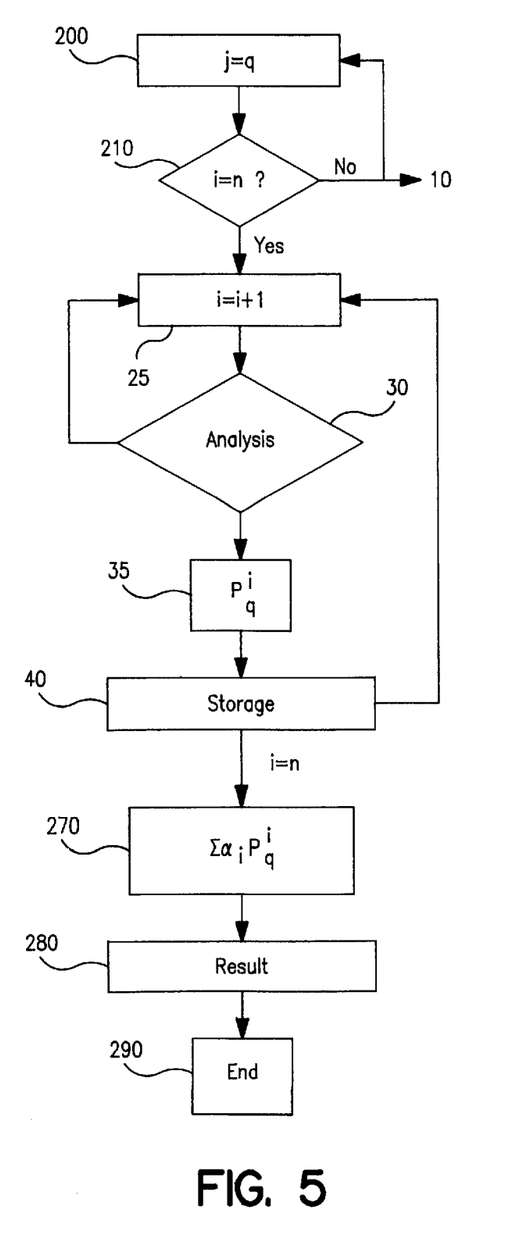
FIG. 5 is an algorithm illustrating the method for calculating the startup time of the data processing system.

FIG. 5 is an algorithm illustrating the way in which these results are used to determine the startup time $T_q$ of any subsequent configuration q chosen by a user.

A configuration is defined in the same way as in steps 20 through 40. Preferably, the user defines, in step 200, a configuration he wishes to use. The condition for using this algorithm is that the quantity n of hardware types that the user wishes to use is at most equal to the maximum quantity of hardware types used to obtain the results 50 and 130. This is the object of step 210. This latter step is comprised of ensuring that the quantity of hardware types satisfies the preceding condition. If this is not the case, two solutions are proposed. The user is invited to redefine a configuration q. In the latter case, the user returns to step 200. Otherwise, another solution is comprised of inviting the user to return to step 10 and to recalculate the results 50 and 130, which correspond to a quantity of hardware types that the user wishes to use. In the latter case, the user is invited to redefine a maximum quantity n of various hardware types.

If the quantity of hardware types satisfies the condition of step 210, steps 25 through 40 are executed. Thus, a configuration of the data processing system S is obtained. Another characteristic of the invention is comprised of deducing the startup time $T_q$ of any subsequently chosen configuration q of the system S. Step 270 is comprised of executing the sum of the products of the time cost $\alpha^i$, calculated previously in step 130 and associated with a hardware unit of a given type i, times the quantity of hardware $P^i_q$ corresponding to type i in any configuration q. The sum of all these products corresponds to the startup time $T_q$ of the configuration q established by the user (step 280). This calculation corresponds to the formula (f) defined above with j=q. Step 290 constitutes the end of the process.

Figure 6A:
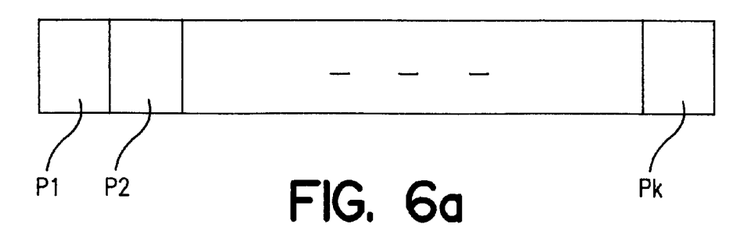
FIGS. 6a, 6b, 6c are variants of the process for determining the startup time.
Figure 6B:
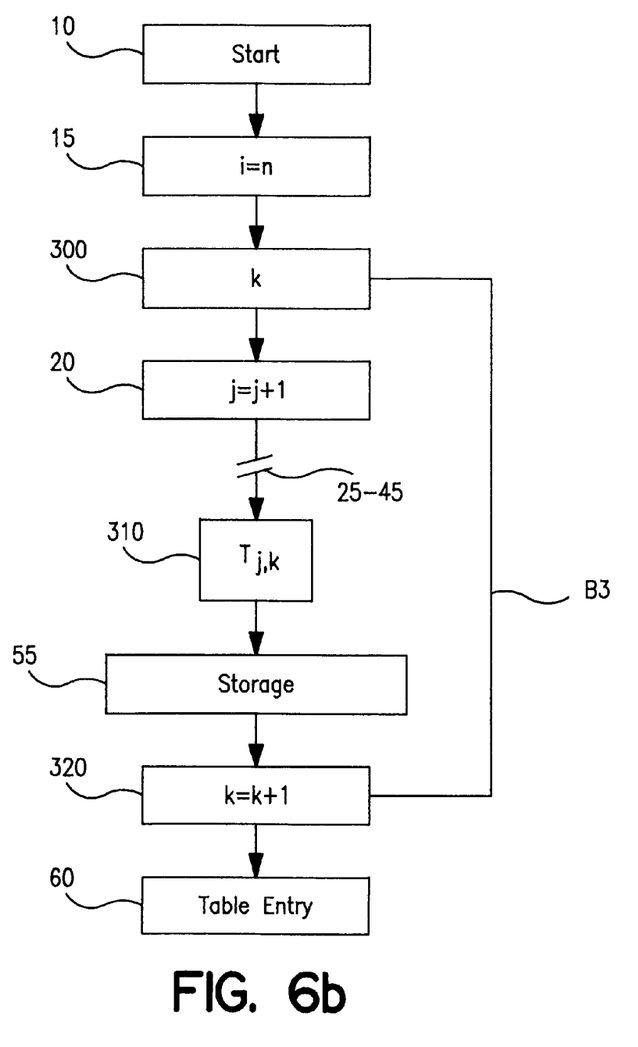

According to another variant of the invention, the unit time costs of each type of hardware, instead of being calculated on the entire startup time, can be broken down into a certain number of unit costs corresponding to phases of the system startup. FIG. 6a represents a breakdown of the startup time into k phases P1 through Pk. Phase P1 can be, for example, the phase of tests known by the name POST. Phase P2 can be the initialization phase, etc. The user first chooses to divide the startup phase into a certain number of distinct phases. The process as applied according to FIGS. 2, 3 and 4 is the same. However, certain steps need to be added. The algorithm of FIG. 6b illustrates the mode of operation.

Figure 3:
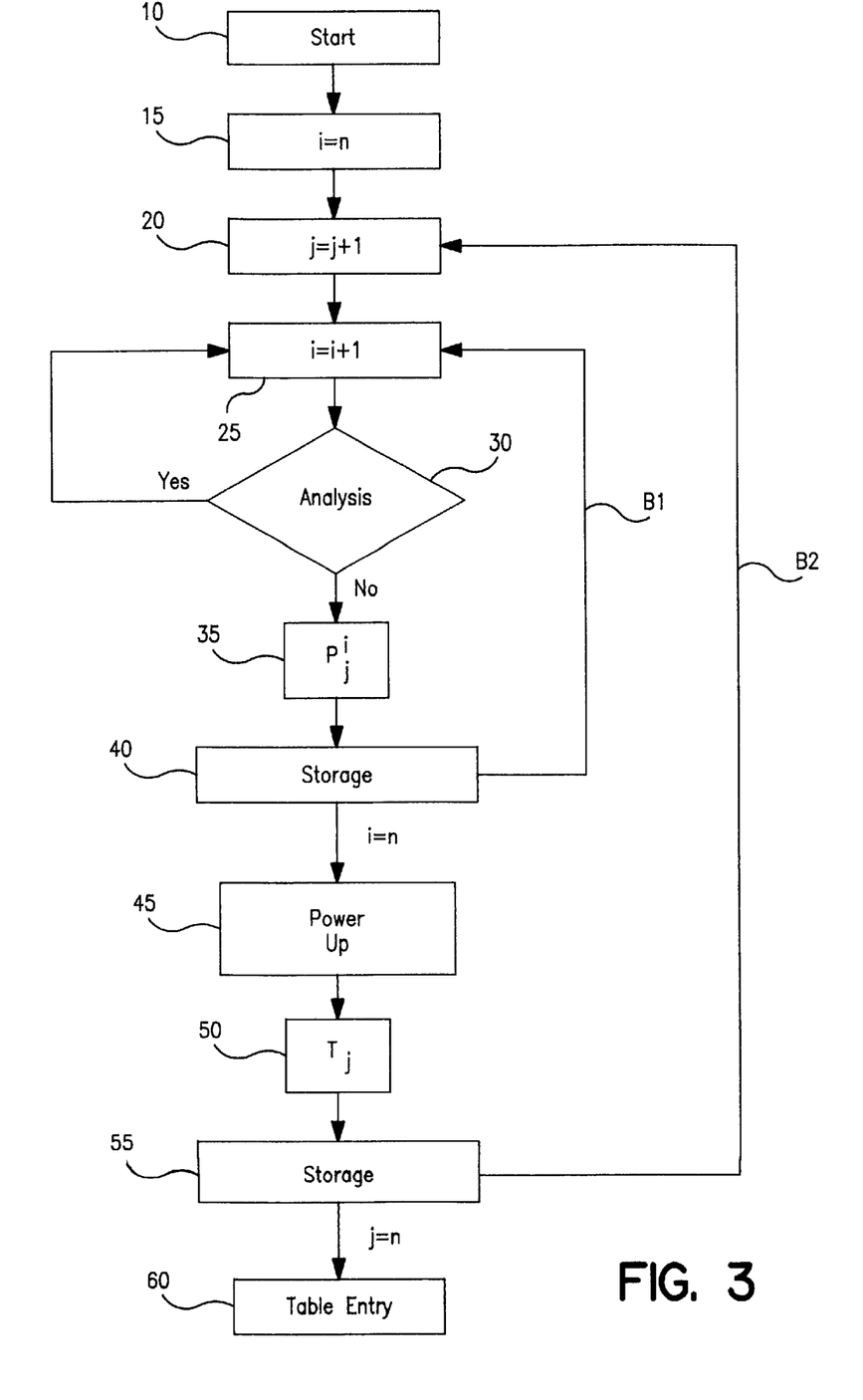
FIG. 3 is an algorithm illustrating one mode of implementation of the process for determining the startup time according to the invention.

Steps 10 and 15 of FIG. 3 remain the same. Step 300, which follows, is comprised of breaking down the startup into several phases and choosing one of them. Next, in step 20, configurations j of the system are defined for each phase. Each step 25–45 of FIG. 3 is executed. Step 310 calculates, for a selected phase k, the startup time $T_{j,k}$ of each configuration j. The formula has the form:

$$T_{j,k} = \sum_{i=0-n} P^i_j \times \alpha^i_k \qquad (g)$$

where:
$T_{j,k}$ is the startup time of the phase k in a configuration j;
k is the phase chosen by the user;
$\alpha^i_k$ is the unit time cost of the hardware unit of type i during the phase k.

Step 55 below is the same as that of FIG. 3. The user is then invited, as an option and if he so desires, to define the next phase k of the startup to which the calculation of the unit time cost $\alpha^i_k$ is to be applied. This step 320 creates a new iterative loop B3. Thus, tables of values, or preferably matrices as defined in FIG. 3, are obtained. At this point, the principle of the algorithm of FIG. 2 is applied, and the unit time cost $\alpha^i_k$ of each hardware unit of type i during the phase k is obtained.

This variant makes it possible to evaluate the impacts of a hardware modification during a phase has previously chosen by the user. $T_{j,k}$ is the startup time of the phase k in a configuration j.

Figure 6C:
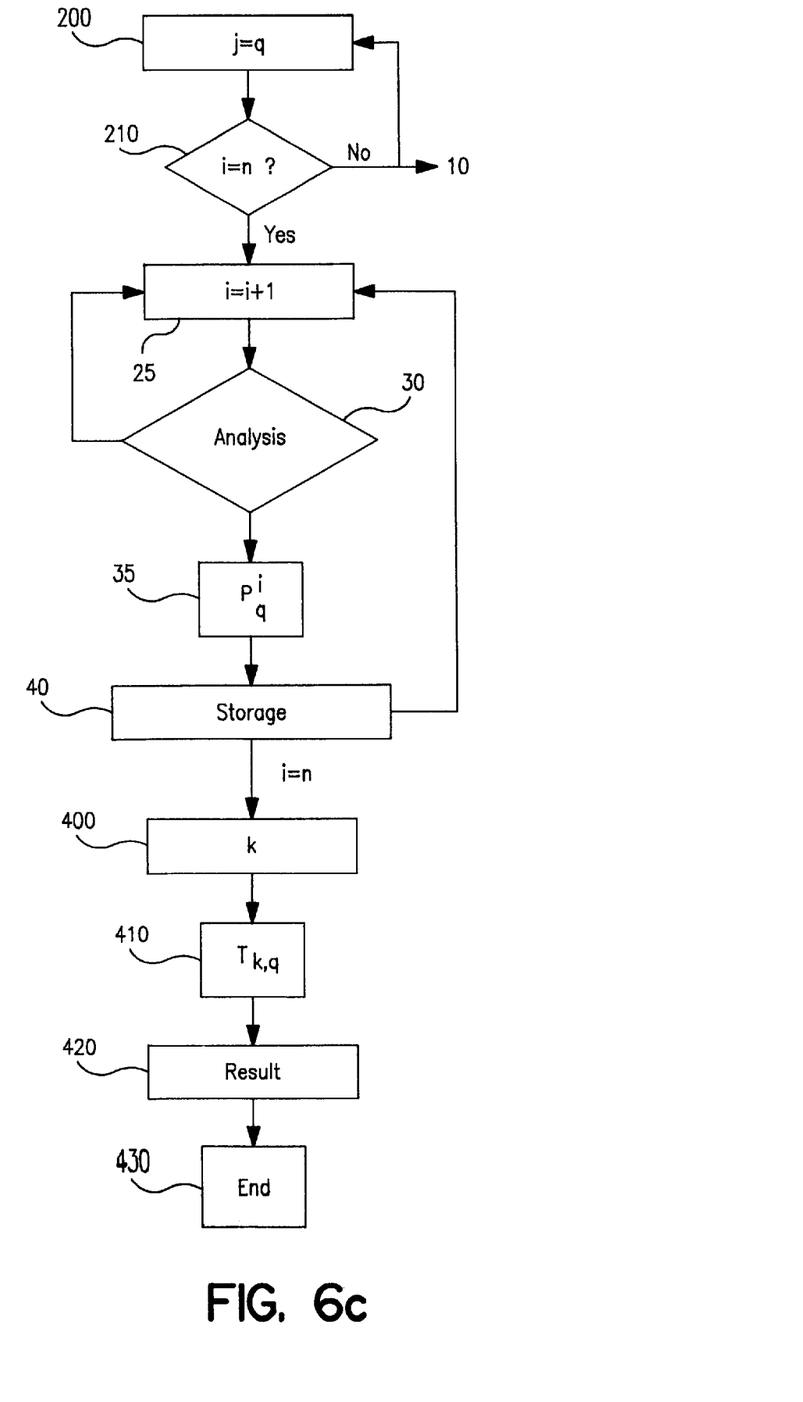

It is possible to deduce the startup time $T_{q,k}$ of the system, for each phase k, of any subsequently chosen configuration q of the system S by applying the process according to the invention. The determination of the startup time $T_{q,k}$ associated with a phase k, relative to any configuration q of the system is calculated with the formula (g), where j=q. Steps 200 and 210 as well as steps 25–40 of FIG. 6c are applicable. Following step 40 of FIG. 6c, a step 400 is added, in which the user chooses any phase k. In step 410, the formula (g) is applied. This step represents the sum of the products of the previously calculated unit time cost $\alpha^i_k$ of the hardware unit of type i calculated during the phase k, which phase k has just been chosen by the user, times the quantity of hardware $P^i_q$ of type i relative to the configuration q. The result is obtained in step 420. Step 430 indicates the end of the process.

Likewise, it is possible to deduce the startup time of the system relative to the configuration q. The latter has the form:

$$T_q = \sum_k T_{q,k}$$

where k is the quantity of phases that the user has chosen previously.

This variant is particularly suited to multi-node, multi-processor systems. In effect, in systems of this type, some startup phases are executed sequentially. On the other hand, some phases are executed in parallel. The user chooses the sequential phases in advance. He can then, according to the invention, apply the process of the invention to each node. It is obvious to one skilled in the art that the startup time of the system S associated with this phase will be the maximum startup time calculated from all the startup times of each node.

Figure 7:
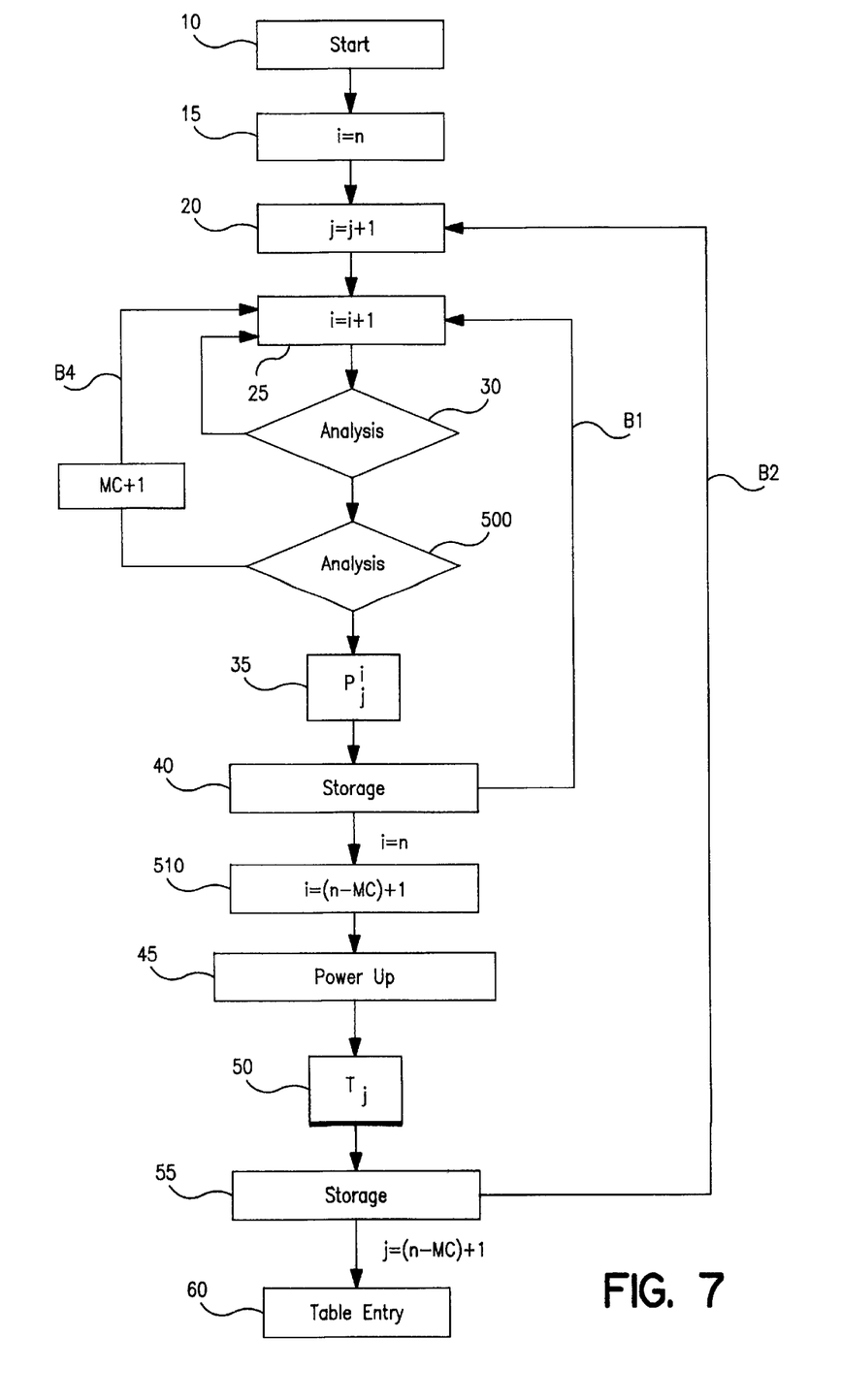
FIG. 7 is an algorithm illustrating another variant of the process for determining the startup time.

Another variant is comprised of gathering into the same set the hardware types i which, while subject to a startup, will not vary among the various configurations j. In the example illustrated, the quantity of hardware of this type is labelled MC. More precisely, this type of hardware does not vary among the various configurations j defined by the iterative loop B1 of FIG. 3. The process is comprised of including, among the hardware types of the matrix [P], a dummy hardware unit constituted by all the hardware whose quantity remains constant among the various hardware configurations j of the system. A global unit time cost is associated with this dummy hardware unit. The desired object is to reduce the total quantity n of hardware in the matrix and, a fortiori, the quantity of configurations, thus reducing the size of each matrix. The algorithm for this purpose is the one in FIG. 7. In the latter, the algorithm of FIG. 3 has been modified. After step 30 of FIG. 3, the process proceeds to a new analysis, step 500 of FIG. 7, in which it determines whether a hardware type i is capable of varying among the various configurations j. If so, it proceeds to the following step 35. In the opposite case, it increases the quantity MC by one unit. The user is invited to return to step 25 to define the next hardware unit i+1, which constitutes an iterative loop B4. A step 510 is simply added, in which the quantity of hardware whose number varies among the various configurations j is determined. Obviously, this number is equal to the quantity n relative to the maximum quantity of various hardware types, from which must be subtracted the quantity MC corresponding to the quantity of hardware of a given type that remains constant among the various configurations j. This quantity is therefore the difference (n−MC). The size of the matrix [P] is therefore the difference (n−MC) to which one unit is added. This is the object of step 510. This latter unit symbolizes the set of hardware whose quantity does not vary among the various configurations j, with which one column of the matrix [P] is associated. The quantity MC can have any value due to the linearity of the formula (f). It is possible, for example, to choose one unit. The next steps are the steps 45 through 55 of FIG. 3. The iterative loop B2 is executed a number of times equal to the difference (n−MC)+1 in order to obtain a two-dimensional matrix [P].

Generally, it may be said that the subject of the invention is a process for determining the startup time of a data processing system S, the data processing system S being constituted by various hardware types i, and the process is comprised of determining the startup time $T_j$ of the system for configurations j and of determining parameters relative to the maximum quantity n of various hardware types from measurements performed on the system, so as to be able to deduce, by calculation and from a formula containing the parameters, the startup time $T_q$ relative to any configuration q of the data processing system S.

Due to the sequential nature of each task, the preceding illustrations show that the parameters are the unit time costs $\alpha^i$ of each hardware of type i. Preferably, the startup time $T_j$ in a configuration j is expressed by the formula:

$$T_j = \sum_{i=0-n} P_j^i \times \alpha^i \qquad (f)$$

where:
  i is the indicator of a given hardware type.
  j is the indicator of the configuration.
  $T_j$ is the startup time of the system for a configuration j.
  $\alpha^i$ is the unit time cost specific to the hardware unit of type i.
  $P_j^i$ is the quantity of hardware of type i in a configuration j.
  n is the quantity of hardware of various types composing the system.

The examples illustrated show the advantage of using a matrix method to determine the unit time costs $\alpha^i$ of each hardware unit of type i. This method, illustrated in FIG. 4, is first comprised of forming a two-dimensional matrix [P] wherein each row represents a configuration j and the columns represent the quantity of the various types of hardware. Next, it is comprised of forming a one-dimensional matrix [T] comprising the times $T_j$ measured. And finally, of calculating the product of the matrix [T] by the inverse of the matrix [P]. It has also been seen that it is possible to reduce the size of the matrices [P] and [T]. This requires including, among the hardware types of the matrix [P], a dummy hardware type constituted by all the hardware (MC) whose quantity remains constant among the various configurations j.

It has been seen in FIGS. 6a, 6b that the unit time costs $\alpha^i$ can be broken down into k unit costs $\alpha^i_k$ which correspond to a phase k of the startup time. The startup time $T_{j,k}$ of the system associated with a phase k in a configuration j is, in this case, expressed by the formula:

$$T_{j,k} = \sum_{i=0-n} P_j^i \times \alpha^i_k \qquad (g)$$

where $\alpha^i_k$ is the unit time cost of the hardware unit of type i during the phase k.

And lastly, it has been seen in FIG. 6 that the determination of the startup time $T_q$ relative to any configuration q of the system is equivalent to the sum of all the startup times $T_{q,k}$ relative to any configuration q of the system associated with each phase k.

Corollary subjects of the invention are a data processing system S comprising at least one processor P and an operating system for implementing the process, and a recording medium for storing the software that is the subject of the invention.

It is apparent from the examples illustrated that the invention offers many advantages. It makes it possible to calculate the startup time of a data processing system from a general mathematical formula. Furthermore, this calculation of the startup time is entirely automatic. It makes it possible to model the startup time and to evaluate the impacts of a hardware modification from the power up through the end of the startup. The invention enables both the customer and the vendor to know the impact of a hardware modification. It has also been seen that this time can be broken down into several phases. Thus, the customer or vendor can know the impact of a hardware modification during any of the phases he has chosen in advance. The process is simple to use; in fact, the utilization of the matrix calculation provides a certain number of advantages. The matrix calculation is available in standard office tools like EXCEL (registered trademark), and therefore are easy and quick to implement. The only condition is that the matrix be invertible. The low cost of the invention is also an enormous advantage. It makes it possible to maintain a simple model without having to do a complete data analysis, which would be costly in terms of time and hardware.

While the preferred forms and embodiments of the invention have been illustrated and described, it will be apparent to those of ordinary skill in the art that various changes and modifications may be made without deviating from the inventive concept and spirit of the invention as set forth above, and it is intended by the appended claims to define all such concepts which come within the full scope and true spirit of the invention.

What is claimed is:

1. A process for modeling the start-up time of a data processing system (S) having a hardware configuration, the start-up time being broken down into a plurality of phases (k), said data processing system (S) being constituted by various types of hardware, the steps of the process comprising measuring the start-up time ($T_j$) of the system (S) for configurations (j), determining parameters relative to the maximum quantity (n) of the various hardware types from measurements performed on the system and, from a formula containing the parameters, calculating the start-up time ($T_q$) relative to any configuration (q) of the data processing system (S), whereby said modeled start-up time is used to evaluate the hardware configuration of said data processing system S.

2. The process according to claim 1, characterized in that the parameters comprise the unit time costs ($\alpha^i$) of each unit of hardware of type i.

3. The process according to claim 2, characterized in that the start-up time ($T_j$) in a configuration j is expressed by the formula:

$$T_j = \sum_{i=0-n} P_j^i \times \alpha^i \qquad (f)$$

where:
  i is the indicator of a given hardware type,
  j is the indicator of the configuration,
  $T_j$ is the start-up time of the system for a configuration j,
  $\alpha^i$ is the unit time cost specific to the hardware unit of type i, $P^i_j$ is the quantity of hardware of type i in a configuration j, n is the quantity of hardware of various types composing the system (S).

4. The process according to claim 3, characterized in that the determination of the unit time cost ($\alpha^i$) of each hardware unit of type i is comprised of:
   a) forming a two-dimensional matrix (P) wherein each row represents a configuration j and the columns represent the quantity of the various hardware types;
   b) forming a one-dimensional matrix (T) comprising the times $T_j$ measured; and
   c) calculating the product of the matrix (T) by the inverse of the matrix (P).

5. The process according to claim 4, characterized in that the hardware types of the matrix (P) include a dummy hardware type constituted by all the hardware (MC) whose quantity remains constant among the various configurations j.

6. The process according to claim 2, characterized in that the determination of the unit time costs ($\alpha^i$) of each hardware unit of type i is comprised of:
   a) forming a two-dimensional matrix (P) wherein each row represents a configuration j and the columns represent the quantity of the various hardware types;
   b) forming a one-dimensional matrix (T) comprising the times $T_j$ measured; and
   c) calculating the product of the matrix (T) by the inverse of the matrix (P).

7. The process according to claim 6, characterized in that the hardware types of the matrix (P) include a dummy hardware type constituted by all the hardware (MC) whose quantity remains constant among the various configurations j.

8. The process according to claim 2, characterized in that the unit time costs ($\alpha^i$) are broken down into k unit costs ($\alpha^i_k$) corresponding to a phase k of the start-up time.

9. The process according to claim 8, characterized in that the start-up time ($T_{j,k}$) of the system associated with a phase k in a configuration j is expressed by the formula:

$$T_{j,k} = \sum_{i=0-n} P^i_j \times \alpha^i_k \qquad (g)$$

where $\alpha^i_k$ is the unit time cost of the hardware unit of type i during the phase K.

10. The process according to claim 9, characterized in that the determination of the start-up time ($T_q$) relative to any configuration q of the system (S) is equivalent to the sum of all the start-up times ($T_{q,k}$) relative to any configuration q of the system associated with each phase k.

11. The process according to claim 1, characterized in that the start-up time ($T_j$) in a configuration j is expressed by the formula:

$$T_j = \sum_{i=0-n} P^i_j \times \alpha^i \qquad (f)$$

where:
   i is the indicator of a given hardware type,
   j is the indicator of the configuration,
   $T_j$ is the start-up time of the system for a configuration j,
   $\alpha^i$ is the unit time cost specific to the hardware unit of type i, $P^i_j$ is the quantity of hardware of type i in a configuration j, n is the quantity of hardware of various types composing the system (S).

12. The process according to claim 11, characterized in that the determination of the unit time costs ($\alpha^i$) of each hardware unit of type i is comprised of:
   a) forming a two-dimensional matrix (P) wherein each row represents a configuration j and the columns represent the quantity of the various hardware types;
   b) forming a one-dimensional matrix (T) comprising the times $T_j$ measured; and
   c) calculating the product of the matrix (T) by the inverse of the matrix (P).

13. The process according to claim 12, characterized in that the hardware types of the matrix (P) include a dummy hardware type constituted by all the hardware (MC) whose quantity remains constant among the various configurations j.

14. The process according to claim 11, characterized in that the unit time costs ($\alpha^i$) are broken down into k unit costs ($\alpha^i_k$) corresponding to a phase k of the start-up time.

15. The process according to claim 14, characterized in that the start-up time ($T_{j,k}$) of the system associated with a phase k in a configuration j is expressed by the formula:

$$T_{j,k} = \sum_{i=0-n} P^i_j \times \alpha^i_k \qquad (g)$$

where $\alpha_{ik}$ is the unit time cost of the hardware unit of type i during the phase k.

16. The process according to claim 15, characterized in that the determination of the start-up time ($T_q$) relative to any configuration q of the system (S) is equivalent to the sum of all the start-up times ($T_{q,k}$) relative to any configuration q of the system associated with each phase k.

17. A modeling system arranged to model a data processing system (S), said data processing system (S) being constituted by various types of hardware and comprising at least one processor (P) and an operating system, the data processing system having a start-up time broken down into a plurality of phases (k), means for measuring the start-up time ($T_j$) of the system (S) for configurations (j), means for determining parameters relative to a maximum quantity (n) of the various hardware types from measurements performed on the system and, from a formula containing the parameters, calculating the start-up time ($T_q$) relative to any configuration (q) of the data processing system (S).

18. The system according to claim 17, characterized in that the parameters comprise unit time costs ($\alpha^i$) of each unit of hardware of type i.

19. The data processing system according to claim 18, characterized in that the means for determining unit time costs ($\alpha^i$) of each hardware unit of type i is comprised of:
   a) forming a two-dimensional matrix (P) wherein each row represents a configuration j and the columns represent the quantity of the various hardware types;
   b) forming a one-dimensional matrix (T) comprising the times $T_j$ measured; and
   c) calculating the product of the matrix (T) by the inverse of the matrix (P).

20. The system according to claim 19, characterized in that the hardware types of the matrix (P), include a dummy hardware type constituted by all the hardware (MC) whose quantity remains constant among the various configurations j.

21. The system according to claim 17, characterized in that the start-up time ($T_j$) in a configuration j is expressed by the formula:

$$T_j = \sum_{i=0-n} P_j^i \times \alpha^i \quad (f)$$

where:
- i is the indicator of a given hardware type,
- j is the indicator of the configuration,
- $T_j$ is the start-up time of the system for a configuration j,
- $\alpha^i$ is the unit time cost specific to the hardware unit of type i,
- $P_j^i$ is the quantity of hardware of type i in a configuration j,
- n is the quantity of hardware of various types composing the system (S).

22. The data processing system according to claim 21, characterized in that the unit time costs ($\alpha^i$) are broken down into k unit costs ($\alpha^i_k$) corresponding to a phase k of the start-up time.

23. The system according to claim 22, characterized in that the start-up time ($T_{j,k}$) of the system associated with a phase k in a configuration j is expressed by the formula:

$$T_{j,k} = \sum_{i=0-n} P_j^i \times \alpha^i_k \quad (g)$$

where $\alpha^i_k$ is the unit time cost of the hardware unit of type i during the phase k.

24. The system according to claim 23, characterized in that the determination of the start-up time ($T_q$) relative to any configuration q of the system (S) is equivalent to the sum of all the start-up times ($T_{q,k}$) relative to any configuration j of the system associated with each phase k.

* * * * *

UNITED STATES PATENT AND TRADEMARK OFFICE
CERTIFICATE OF CORRECTION

PATENT NO. : 6,202,190 B1  
DATED : March 13, 2001  
INVENTOR(S) : Rogier

It is certified that error appears in the above-identified patent and that said Letters Patent is hereby corrected as shown below:

Column 4,  
Line 50, should read: -- $T_j = \sum_{i=0 \to n} P^i_j \times \alpha^i \quad (f)$ --;

Column 5,  
Line 45, should read: -- $N_j = \sum_{i=0 \to n} P^i_j$ --;

Column 7,  
Line 41, should read: -- $T_{j,k} = \sum_{i=0 \to n} P^i_j \times \alpha^i_k \quad (g)$ --;

Column 9,  
Line 21, should read: -- $T_j = \sum_{i=0 \to n} P^i_j \times \alpha^i \quad (f)$ --;

Line 56, should read: -- $T_{j,k} = \sum_{i=0 \to n} P^i_j \times \alpha^i_k \quad (g)$ --;

Column 10,  
Line 57, should read: -- $T_j = \sum_{i=0 \to n} P^i_j \times \alpha^i \quad (f)$ --;

Column 11,  
Line 42, should read: -- $T_{j,k} = \sum_{i=0 \to n} P^i_j \times \alpha^i_k \quad (g)$ --;

Line 57, should read: -- $T_j = \sum_{i=0 \to n} P^i_j \times \alpha^i \quad (f)$ --;

UNITED STATES PATENT AND TRADEMARK OFFICE
CERTIFICATE OF CORRECTION

PATENT NO. : 6,202,190 B1
DATED : March 13, 2001
INVENTOR(S) : Rogier

It is certified that error appears in the above-identified patent and that said Letters Patent is hereby corrected as shown below:

Column 12,
Line 26, should read: -- $T_{j,k} = \sum_{i=0 \to n} P_j^i \times \alpha_k^i$  (g)  --;

Line 31, delete "$\alpha_{ik}$" and substitute with -- $\alpha_k^i$ --;

Column 13,
Line 4, should read: -- $T_j = \sum_{i=0 \to n} P_j^i \times \alpha^i$  (f)  --;

Column 14,
Line 8, should read: -- $T_{j,k} = \sum_{i=0 \to n} P_j^i \times \alpha_k^i$  (g)  --;

Signed and Sealed this

Eighth Day of October, 2002

*Attest:*

*Attesting Officer*

JAMES E. ROGAN
*Director of the United States Patent and Trademark Office*